United States Patent [19]

Blount

[11] Patent Number: 4,826,396

[45] Date of Patent: May 2, 1989

[54] ROTOR SELF-LUBRICATING AXIAL STOP

[75] Inventor: Dale H. Blount, Huntsville, Ala.

[73] Assignee: The United States of America as represented by the Administrator of the National Aeronautics and Space Administration, Washington, D.C.

[21] Appl. No.: 149,830

[22] Filed: Jan. 29, 1988

[51] Int. Cl.$^4$ .............................................. F04D 29/04
[52] U.S. Cl. ................................ 415/104; 415/170.1; 415/174.3; 384/368
[58] Field of Search ........... 415/104, 106, 107, 170 R, 415/170 A, 172 R, 174, 175; 384/368, 371, 908, 909, 902

[56] References Cited

U.S. PATENT DOCUMENTS

| | | | |
|---|---|---|---|
| 2,587,408 | 2/1952 | Trask | 384/371 X |
| 3,264,215 | 8/1966 | Smith et al. | 384/368 |
| 3,466,102 | 9/1969 | Goodwyn | 384/368 X |
| 3,549,217 | 12/1970 | Watson | 384/368 |
| 3,563,618 | 2/1971 | Ivanov | 415/104 X |
| 3,895,689 | 7/1975 | Swearingen | 415/104 X |
| 3,960,468 | 6/1976 | Boorse et al. | 415/104 X |

Primary Examiner—Robert E. Garrett
Assistant Examiner—Joseph M. Pitko
Attorney, Agent, or Firm—William J. Sheehan; John R. Manning; Charles E. B. Glenn

[57] ABSTRACT

A plurality of lubricating plugs are disposed in the stationary backup face adjacent to the axial stop face of a rotating impeller mounted in a turbopump for pumping liquid oxygen or liquid hydrogen. The stop face and the backup face are those surfaces which engage when the axial load on the impeller exceeds the load balancing capability. The plugs have a truncated conical configuration so as to be trapped in the backup face, and are disposed at varying radii on the face to provide complete surface lubrication. The plugs may be formed from Teflon, Kel-F or bronze filled Teflon.

20 Claims, 1 Drawing Sheet

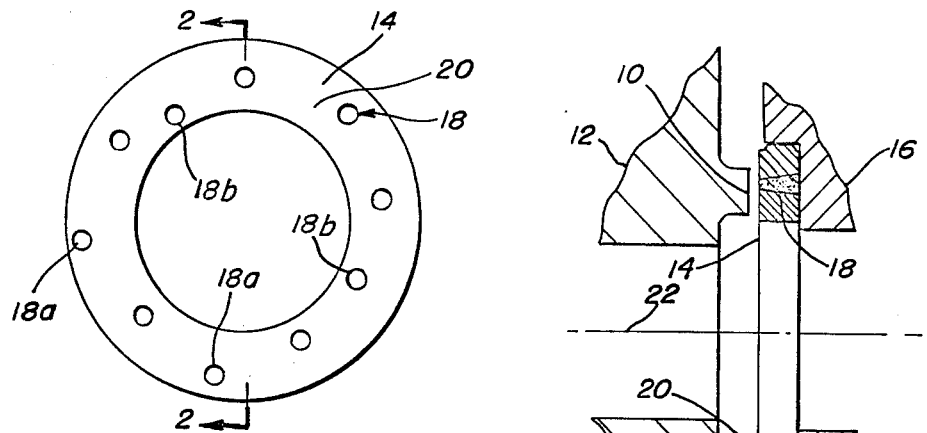
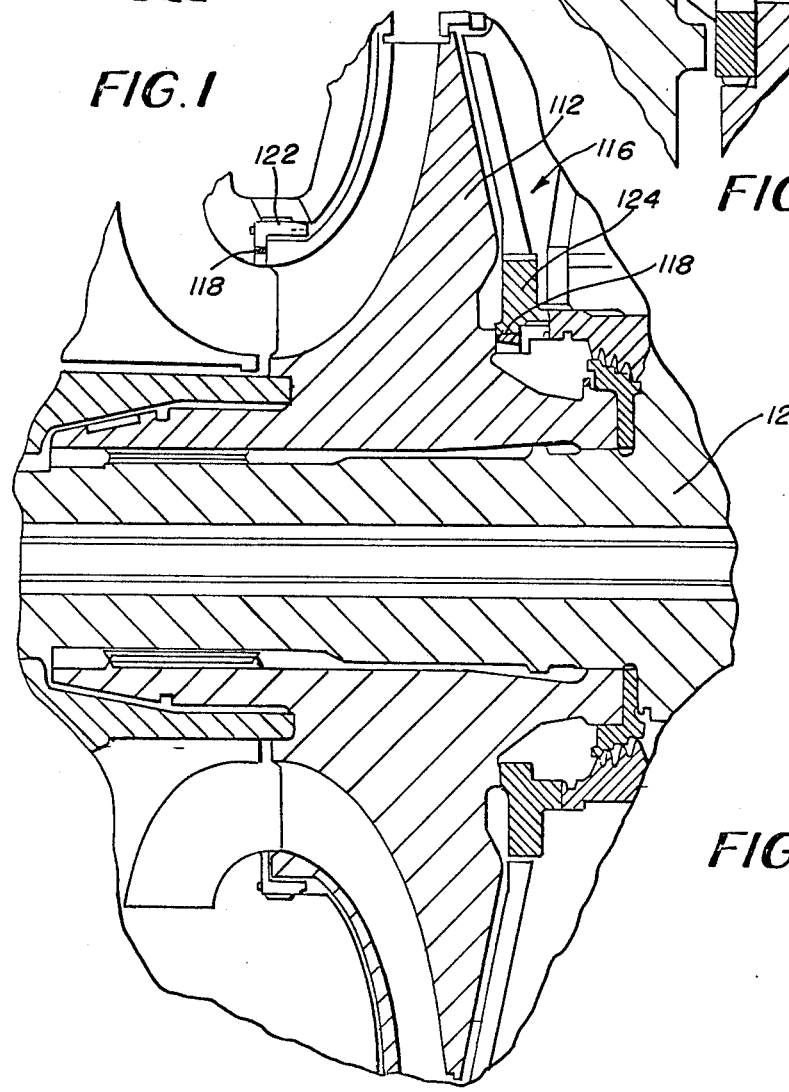

ROTOR SELF-LUBRICATING AXIAL STOP

ORIGIN OF THE INVENTION

The invention described herein was made by an employee of the United States Government and may be manufactured and used by or for the Government for Government purposes without the payment of any royalties thereon or therefor.

BACKGROUND OF THE INVENTION

This invention relates to the lubrication of the contact surface of the axial stop face of a rotor with a stationary housing stop surface, and more particularly to the lubrication of the rubbing contact area between the axial stop face of a turbopump impeller against a cooperating stationary face of the turbopump housing.

Rocket engines, such as the space shuttle main engine, use turbopumps for pumping the liquid hydrogen and liquid oxygen used for providing the combustible propellent. During the main stage operation of the rocket engine, the axial forces on the rotating turbopump shaft, impellers, seals and bearings are balanced by a variable force provided by using a controlled variable pressure balancing cavity and thrust piston. However, during the start-up and shut-down transients, an unbalanced axial force generally results on the impeller or the rotor. When the rotor bearings are incapable of absorbing this unbalanced axial force, the force is absorbed or counter-acted by the action of contact between a face of the rotor, i.e., the axial stop face, against a cooperating or mating backup face on the stationary housing acting as a stop, either or both a forward stationary stop or an aft stationary stop.

The problem presented by this rotational sliding contact at the high speeds and thus severe loads under which such turbopumps function is that high frictional heating and short service lives result. Both hydrogen and oxygen have very little lubricating effect so that excessive wear of the contact surfaces is a particular problem in this environment. Furthermore, and more importantly, frictional heating which results from the sliding contact provides a safety hazard, particularly in the oxygen environment where there is a low threshold of ignition for most metals.

Reinforced synthetic resin polymer, such as that marketed under the brand name Teflon and bronze Teflon bearing cages have been used successfully in liquid oxygen and liquid hydrogen environments to lubricate ball bearings and roller bearings where periodic rubbing contact occurs between the rolling elements and the cage. Thus, it is known that such materials such as Teflon and bronze filled Teflon are suitable for use in the oxygen and hydrogen environments of such turbopumps. However, there are no known means for lubricating the axial stop face and mating housing backup face utilized in such turbopumps.

SUMMARY OF THE INVENTION

Accordingly, it is a primary object of the present invention to provide a source of a dry or solid film lubrication to the rubbing contact surface between the axial stop face of a rotor and the stationary housing mating backup face against which the rotor rubs when the axial force on the rotor effects rubbing contact therebetween.

It is another object of the present invention to provide small plugs in the stationary housing backup face which contacts the axial stop face of a rotor, the plugs being of a suitable oxygen and/or hydrogen compatable lubricating material for operating in a liquid oxygen and/or liquid hydrogen environment.

It is a further object of the present invention to provide a plurality of lubricating plugs of suitable material for operating in a liquid oxygen environment or in a liquid hydrogen environment, the plugs being disposed for providing lubrication between the rotating axial stop face of a rotor and the load absorbing stationary housing backup face cooperating therewith, the plugs being disposed to provide complete surface lubrication and mounted so as to prevent them from escaping from the rubbing surface.

Accordingly, the present invention provides a plurality of lubricating plugs disposed in the stationary backup face of a stationary housing adjacent to the axial stop face of a rotating impeller, the impeller and stationary members being elements of a turbopump. The turbopump may be used for pumping liquid oxygen or liquid hydrogen, and the plugs in that case should comprise a lubricating material compatable therewith. The plugs may be installed by embedding them at varying radii in the stationary backup face for providing complete surface lubrication between the axial stop face of the impeller and the stationary backup face. Additionally, although less practical because of the high centrifugal forces thereon, the plugs could be embedded in the impeller.

The invention thereby provides lubrication between the rubbing contact surfaces to increase the operational life of the turbopump and to reduce the safety hazards associated with ignition of contacting metals in a liquid oxygen turbopump. Additionally, by reducing the friction in the turbopump, unequal pump accelerations should be reduced during the start-up transient thereby reducing the demands on the control of the variable pressure system during that period.

BRIEF DESCRIPTION OF THE DRAWINGS

The particular features and advantages of the invention as well as other objects will become apparent from the following description taken in connection with the accompanying drawings, in which:

FIG. 1 is a diagrammatic view of a stationary axial stop backup face incorporating lubricating plugs in accordance with the principles of the present invention;

FIG. 2 is a cross sectional view taken substantially along line 2—2 of FIG. 1 illustrating the axial stop contact surfaces between the rotor and the stationary housing; and FIG. 3 is a fragmentary cross sectional view through a turbopump illustrating self-lubricating axial stops constructed in accordance with the principles of the present invention.

DESCRIPTION OF THE PREFERRED EMBODIMENT

Referring now to FIGS. 1 and 2 an axial stop face 10 of a rotatable metal rotor or impeller 12 is illustrated, the stop face 10 being either the forward or aft face of a turbopump rotor. As aforesaid, during pump start-up and shut-down, the axial forces on the rotor are unbalanced and must be absorbed by contact of the axial stop face 10 with a stationary annular backup stop 14 disposed in a portion of the stator or stationary housing 16. Conventionally, the backup stop is metallic and results in a reduction of the operational or service life of the turbopump between overhauls, and in an oxygen environment, such as where the turbopump is functioning to supply liquid oxygen to a rocket engine, can result in a hazardous condition.

Accordingly, the present invention proposes the insertion of a plurality of plugs 18 circumferentially about the backup stop 14 in each of the stationary axial stop backup faces, such as face 20, the plugs having a frontal area substantially coextensive with the backup face 20 so as to engage the axial stop face 10 when those faces are forced together due to the axial transient loads on the rotor during start-up and shut-down. The plugs 18 are elongated members preferably having a truncated conical configuration and extends into the body of the stationary backup stop 14, the truncated configuration permitting insertion from the back side of the backup stop 14 so as to trap the plugs in the contact surface material and prevent escape therefrom if unequal thermal expansion were to loosen them. Additionally, in order to assure complete surface lubrication, the plugs 18 may be disposed in the surface 20 at varying radii relatively to the centerline 22 of the backup stop 14 and of the motor 12, this variation being illustrated by the radial dispositions of the plugs 18a and 18b.

The plugs must be formed from a suitable lubricating material compatable with the working fluid of the turbopump, and for application with liquid hydrogen or liquid oxygen, fluorocarbon synthetic resin polymers which are inert and stable plastics with a wide temperature range appear suitable and compatable. For example, polytetrafluorethylene (Teflon), polymonochlorotrifluorethylene (Kel-F) or possibly a bronze filled or impregnated Teflon (Saylox M) should function quite well for these purposes. Thus, the contact surface between the axial stop face 10 and the backup face 20 resulting from the unbalanced axial load on the rotating impeller or rotor 12 during the start-up and shut-down transients is lubricated by the dry film lubrication provided by the plugs 18.

In FIG. 3, which is a fragmentary section through a rocket engine hydrogen turbopump, the impeller or rotor 112 is fastened to a shaft 120 for rotation relative to the stationary housing, indicated generally at 116. The housing includes forward and aft stationary stops or backups 122, 124, respectively operatively secured to portions of the housing for forming the backup face. As illustrated, the plugs 118 are disposed in the backup stop faces so as to avoid changing the dynamic vibration or stress characteristics of the rotor. However, it is possible for the plugs to be disposed in the rotor should this be found to be desirable, and such variation from the preferred embodiment is contemplated by the present invention. Lubrication, of course results when the rotor engages the lubricating plugs embedded in the forward or aft stops.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herewith is:

1. In a turbopump or the like for acting on a fluid, said turbopump having a rotor adapted for rotation about an axis within a housing, said housing having a stationary backup face, said rotor having a stop face disposed adjacent to said stationary backup face, said stop face adapted for engaging said backup face when the axial force on the rotor is not otherwise balanced, the improvement comprising, a plurality of plugs disposed in spaced apart relationship in one of said faces, said plugs comprising synthetic plastic material having dry film lubricating characteristics and being inert and stable in said fluid.

2. In a turbopump or the like as recited in claim 1, wherein said fluid comprises one of liquid oxygen and liquid hydrogen, and said plastic material comprises a fluorocarbon synthetic resin polymer.

3. In a turbopump or the like as recited in claim 2, wherein said plastic material is selected from the group consisting of polytetrafluorethylene and polymonochlorotrifluorethylene.

4. In a turbopump or the like as recited in claim 2, wherein said plugs have a truncated conical configuration.

5. In a turbopump or the like as recited in claim 4, wherein said plastic material is selected from the group consisting of polytetrafluorethylene and polymonochlorotrifluorethylene.

6. In a turbopump or the like as recited in claim 4, wherein said fluid comprises one of liquid oxygen and liquid hydrogen, and synthetic plastic material comprises a fluorocarbon synthetic resin polymer impregnated with bronze.

7. In a turbopump or the like as recited in claim 4, wherein said plugs are disposed at varying radii relative to the rotational axis of said rotor.

8. In a turbopump or the like as recited in claim 2, wherein said plugs are disposed at varying radii relative to the rotational axis of said rotor.

9. In a turbopump or the like as recited in claim 8, wherein said plastic material is selected from the group consisting of polytetrafluorethylene and polymonochlorotrifluorethylene.

10. In a turbopump or the like as recited in claim 8, wherein said fluid comprises one of liquid oxygen and liquid hydrogen, and synthetic plastic material comprises a fluorocarbon synthetic resin polymer impregnated with bronze.

11. In a turbopump or the like as recited in claim 1, wherein said fluid comprises one of liquid oxygen and liquid hydrogen, and said synthetic plastic material comprises a fluorocarbon synthetic resin polymer impregnated with bronze.

12. In a turbopump or the like as recited in claim 11, wherein said fluorocarbon polymer comprises tetrafluorethylene.

13. In a turbopump or the like as recited in claim 1, wherein said plugs have a truncated conical configuration.

14. In a turbopump or the like as recited in claim 1, wherein said plugs are disposed at varying radii relative to the rotational axis of said rotor.

15. In a turbopump or the like as recited in claim 14, wherein said plugs have a truncated conical configuration.

16. In a turbopump or the like as recited in claim 15, wherein the smaller base surface of said conical plugs are coextensive with said one of said faces.

17. In a turbopump or the like as recited in claim 15, wherein said fluid comprises one of liquid oxygen and liquid hydrogen, and said plastic material comprises a fluorocarbon synthetic resin polymer.

18. In a turbopump or the like as recited in claim 17, wherein said plastic material is selected from the group consisting of polytetrafluorethylene and polymonochlorotrifluorethylene.

19. In a turbopump or the like as recited in claim 15, wherein said fluid comprises one of liquid oxygen and liquid hydrogen, and synthetic plastic material comprises a fluorocarbon synthetic resin polymer impregnated with bronze.

20. In a turbopump or the like as recited in claim 19, wherein said fluorocarbon polymer comprises tetrafluorethylene.

* * * * *